(12) United States Patent
Chomakov et al.

(10) Patent No.: US 10,621,179 B2
(45) Date of Patent: Apr. 14, 2020

(54) METHOD FOR DEOBFUSCATION OF CUSTOMER CLICKSTREAM TELEMETRY DATA

(71) Applicant: VMware, Inc., Palo Alto, CA (US)

(72) Inventors: Vasil Chomakov, Sofia (BG); Stanislav Hadjiiski, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 254 days.

(21) Appl. No.: 15/653,025

(22) Filed: Jul. 18, 2017

(65) Prior Publication Data

US 2019/0026341 A1  Jan. 24, 2019

(51) Int. Cl.
*G06F 17/30* (2006.01)
*G06F 16/2455* (2019.01)
*G06Q 30/02* (2012.01)
*G06F 16/13* (2019.01)
*G06F 16/25* (2019.01)
*G06F 16/903* (2019.01)

(52) U.S. Cl.
CPC ...... *G06F 16/24568* (2019.01); *G06F 16/137* (2019.01); *G06F 16/258* (2019.01); *G06F 16/90344* (2019.01); *G06Q 30/0201* (2013.01)

(58) Field of Classification Search
CPC ........................................... G06F 21/00
USPC ............................ 707/698; 705/51; 713/716
See application file for complete search history.

(56) References Cited

U.S. PATENT DOCUMENTS

2013/0160125 A1* 6/2013 Likhachev ............ G06F 21/564
726/24

* cited by examiner

*Primary Examiner* — Baoquoc N To
(74) *Attorney, Agent, or Firm* — Thomas Horstemeyer, LLP (57) ABSTRACT

One or more embodiments provide techniques for analyzing telemetry data. A telemetry agent collects streams of raw telemetry data from the web client. The telemetry data includes obfuscated strings. For each obfuscated string, a mapping program references a database associating the obfuscated string to attributes of a properties file of the web client. The attributes include at least the deobfuscated string corresponding to the obfuscated string. An analytics agent translates the streams of raw telemetry data to streams of modified telemetry data. The streams of modified telemetry data include deobfuscated string from the attributes corresponding to the properties file. The analytics agent analyzes the streams of modified telemetry data.

20 Claims, 5 Drawing Sheets

METHOD FOR DEOBFUSCATION OF CUSTOMER CLICKSTREAM TELEMETRY DATA

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor," includes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

To improve user experience of a web client (e.g., a web client running on a VM), telemetry information about each user click may be collected. Contextual information of a click typically includes the label of the clicked component so that it can be identified and differentiated from other components in the product. Accordingly, a provider is able to perform analytics on the collected telemetry information to improve user experience with the web client.

SUMMARY

One or more embodiments provide techniques for analyzing telemetry data. A telemetry agent collects streams of raw telemetry data from the web client. The telemetry data includes obfuscated strings. For each obfuscated string, a mapping program references a database associating the obfuscated string to attributes of a properties file of the web client. The attributes include at least the deobfuscated string corresponding to the obfuscated string. An analytics agent translates the streams of raw telemetry data to streams of modified telemetry data. The streams of modified telemetry data include deobfuscated string from the attributes corresponding to the properties file. The analytics agent analyzes the streams of modified telemetry data.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
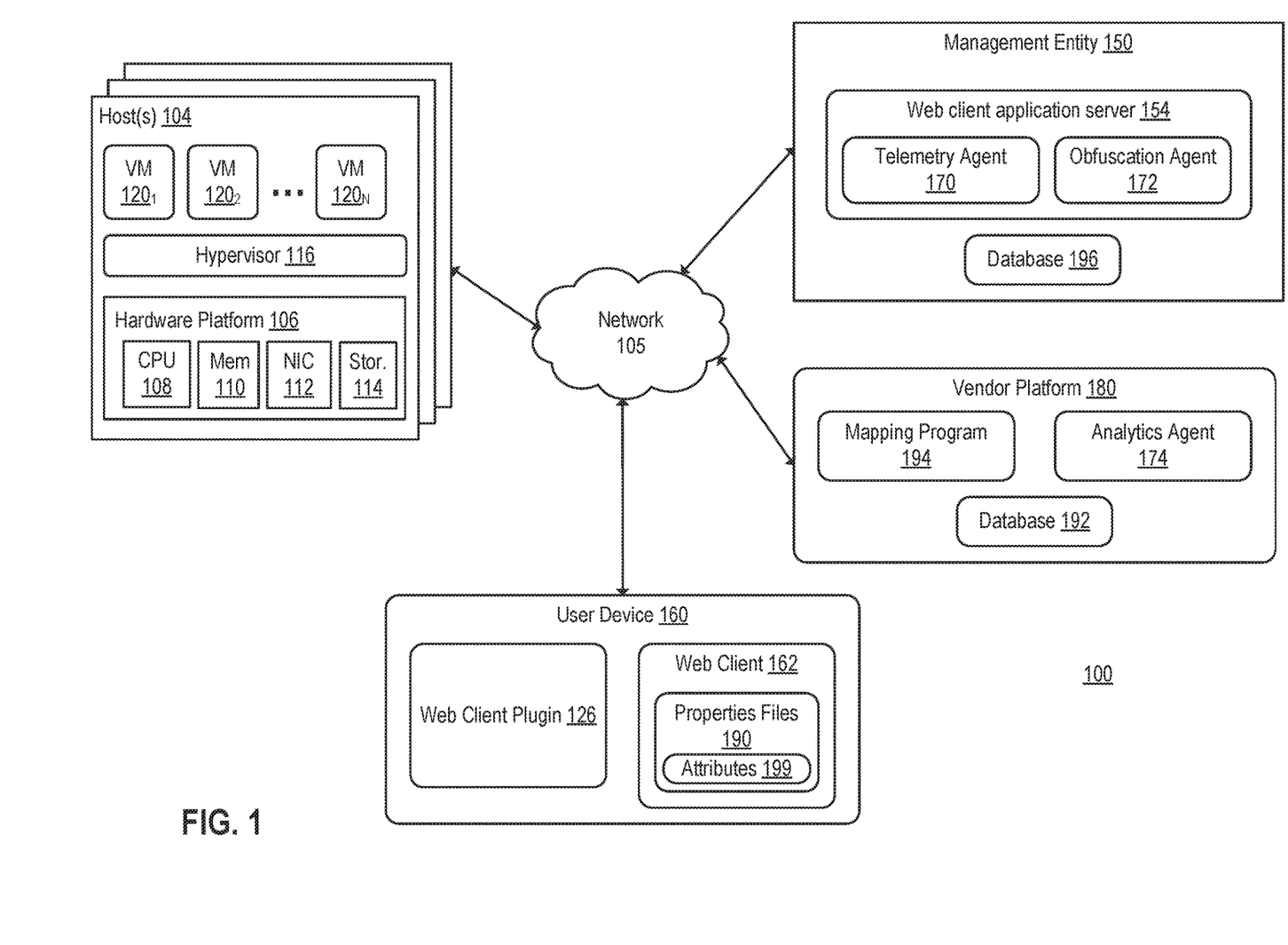
FIG. 1 is a block diagram of a hybrid cloud computing system, according to one embodiment disclosed herein.

FIG. 1 is a schematic diagram illustrating an example virtualized computing environment 100. Although an example is shown, it should be understood that sample virtualized computing environments 100 may include additional or alternative components, and may have a different configuration. In a virtualized computing environment, such as virtualized computing environment 100, users may manage, monitor, and administer various objects (e.g., hosts, virtual machines, storage resources, etc.) using a web client (e.g., web client 162).

Virtualized computing environment 100 includes one or more host computer systems ("host 104"). Hosts 104 may be constructed on a server grade platform 106, such as an x86 architecture platform. As shown, hardware platform 106 of each host 104 may include conventional components of a computing device, such as one or more processors (CPUs) 108, system memory 110, a network interface 112, a storage system 114, and other I/O devices, such as, for example, a mouse and keyboard (not shown). CPU 108 is configured to execute instructions, for example, executable instructions that perform one or more operations described herein and may be stored in memory 110 an in local storage. Memory 110 is a device allowing information, such as executable instructions, cryptographic keys, virtual disks, configurations, and other data to be stored and retrieved. Memory 110 may include, for example, one or more random access memory (RAM) modules. Network interface 112 may be one or more network adapters, also referred to as Network Interface Card (NIC). Storage system 114 represents local storage (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116 that enables sharing of the hardware resources of host 104 by VMs 120. One example of the hypervisor 116 that may be used in an embodiment described herein is a VMware ESXi™ hypervisor provided as part of the VMware vSphere® solution made commercially available from VMware, Inc., of Palo Alto, Calif. Hypervisor 116 may run on top of the operating system of host 104 or directly on hardware components of host 104.

Virtualized computing environment 100 may further include management entity 150, which is accessible by user devices 160 to manage various objects (e.g., hosts 104, VMs 120, storage systems 114, etc.). Management entity 150 generally provides various objects for any suitable purpose, such as deployment, provisioning, lifecycle management, maintenance, and the like. In practice, management entity 150 may be implemented using a virtual machine.

A user may operate user device 160 to access a functionality of management entity 150 using a web client 162, such as VMware vSphere® web client. Management entity 150 may further support web client application server 154 to provide user interface access and plugin functionality for web client 162. Web client 162 may be any suitable browser-based application such as based on any suitable architecture supported by web client application server 154.

An example architecture may include a user interface layer with an application that displays user interface element with which users interact (e.g., menus, navigation elements, etc.). A service layer of the example architecture may facilitate various services. User devices 160 may be operated by any suitable users, such as system administrators, organization administrators, database users, application developers, system architects, etc. Any suitable computing device may be used as user device 160, such as desktop computer, mobile device, tablet computer, and personal digital assistant, etc.

To extend functionality of web client 162, virtual machine 120 may further include a web client plugin 126 that includes configuration information of a web client plugin for web client 162. For example, web client plugin 126 may be used to extend web client 162 in any suitable manner, such as by adding new user interface elements that retrieve and display data associated with virtual machine 120. In practice, web client plugin 126 may include configuration information and plugin modules that are bundled together as a package.

Management entity 150 may further include a telemetry agent 170. Telemetry agent 170 is configured to improve the user experience with web client 162 by collecting telemetry data about each user click in the web client 162. The contextual information of a click typically includes a label of the clicked component so that it can be identified and differentiated from other components in web client 162.

When enabling telemetry collection, users may sign a consent form, which describes that the telemetry data collected by telemetry agent 170 does not contain any user-identifiable information or any sensitive data (e.g., IP addresses, usernames, passwords, company names, and the like). Additionally, because web client 162 may be a highly extensible product, i.e., web client 162 allows second and third parties to write plug-ins, there is also a risk that some plug-ins (e.g., web client plugin 126) would expose a sensitive data as a label of some user interface control, and sensitive information may be collected as part of telemetry collection. As such, management entity 150 may include an obfuscation agent 172, which obfuscates all collected text values. Obfuscation agent 172 may apply a hashing algorithm to each collected string value to generate a unique obfuscated value corresponding to the string value. For example, obfuscation agent 172 may apply a one-way hashing algorithm to the string "Administrator@vsphere.local" to obtain a unique obfuscated value of "2bb6e3f6e9b7fc17326a58b4c60167de79190ddebb1f-38c18ee4f02c6f861c2f."

Virtualized computing environment 100 further includes a vendor platform 180. Vendor platform 180 may include an analytics agent 174. When performing subsequent analytics on the collected telemetry information in vendor platform 180, analytics agent 174 may have difficulties analyzing the obfuscated values. For example, analytics agent 174 may determine that the button with title "<Hash_Value_X>" is the most clicked on button by the user. Because the string value was obfuscated into "Hash_Value_X," analytics agent 174 is not able to determine which button is the most clicked button by the user. Therefore, to allow analytics agent 174 to make useful insights, there needs to be a way to deobfuscate only the string labels that do not contain user-sensitive information.

Each web client 162 typically includes a set of *.properties files (e.g., properties files 190), which contain each user-visible string values in user device 160. There exists a version of properties files for all supported languages, e.g., English, German, French, etc. Each properties file 190 may include attributes 199. Attributes 199 of properties file 190 may include the unobfuscated (plain-text) value of an entry in properties files 190, the locale of the entry, and the key of the properties file 190 so that obfuscated values of the same string in other locales can be found. Generally, properties files 190 do not contain customer-identifiable information, as properties files 190 comprise hard-coded strings, which are the same for any user. Additionally, any text visible to the user in web client 162, which comes as a part of web client 162, is specified in at least one properties file 190. For example, a virtual machine name, such as "company-finance" is not contained in a properties file 190; however, the string "Edit Virtual Machine Settings" is. The first example (i.e., "company-finance") is customer identifiable, sensitive, data, which will be obfuscated, and the second ("Edit Virtual Machine Settings") is not. In one embodiment, properties files 190 may be packed with web client 162 when a user installs web client 162 on user device 160. In another embodiment, properties files 190 of web client 162 may be accessible via web client application server 154. In the current example shown in FIG. 2, properties files 190 is shown packed with web client 162.

For analytics purposes, to be able to deobfuscate only the obfuscated strings which do not contain user-sensitive information (e.g., "Edit Virtual Machine"), a database 192 is created that maps each unique obfuscated value (i.e., "key") to the natural language version of the obfuscated string (i.e., "value"). Continuing with the above example, the value would be "Edit Virtual Machine Settings" and the key would be the obfuscated value corresponding to "Edit Virtual Machine Settings." The mapping is then stored in database 192 that is accessible by analytics agent 174. In one example, database is stored in vendor platform 180. In this embodiment, database 192 is inaccessible by users of user device 160. In another example, database 192 may be packaged with web client 162. In another example, database 192 may be accessible via web client application server 154.

Figure 2A:
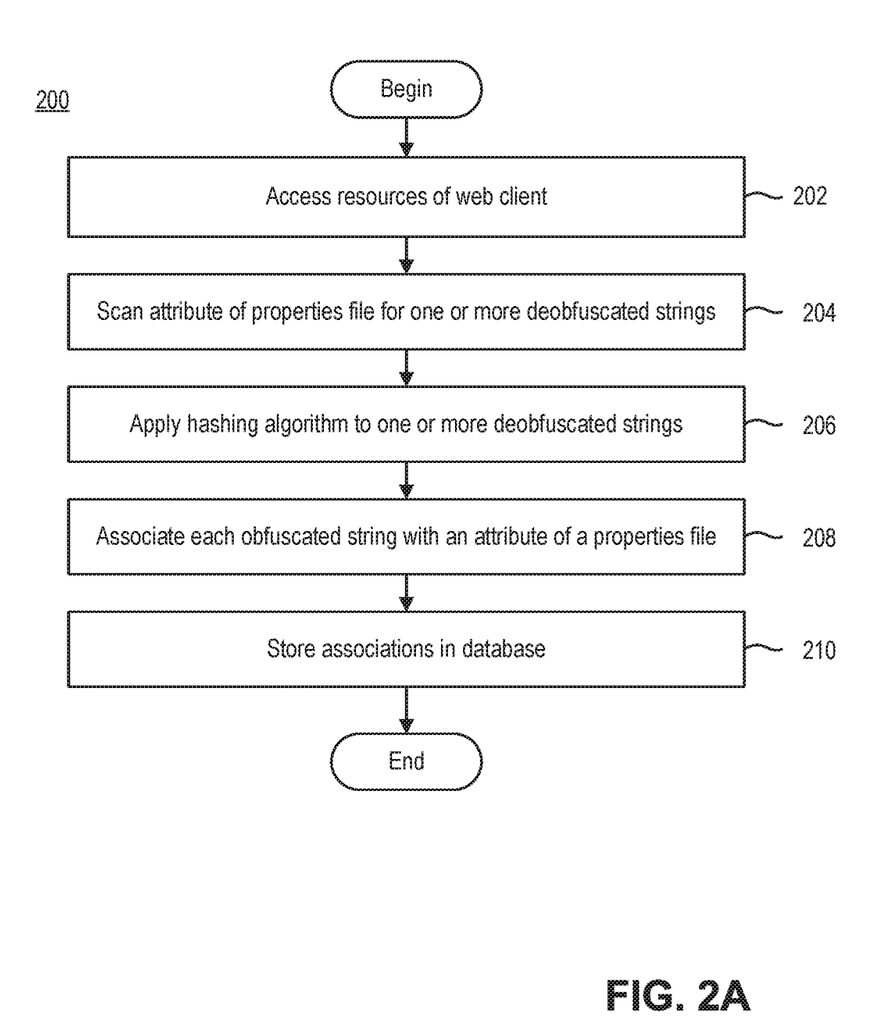
FIG. 2A is a flow diagram illustrating a method of creating database storing key/value mappings, according to an embodiment.
Figure 3A:
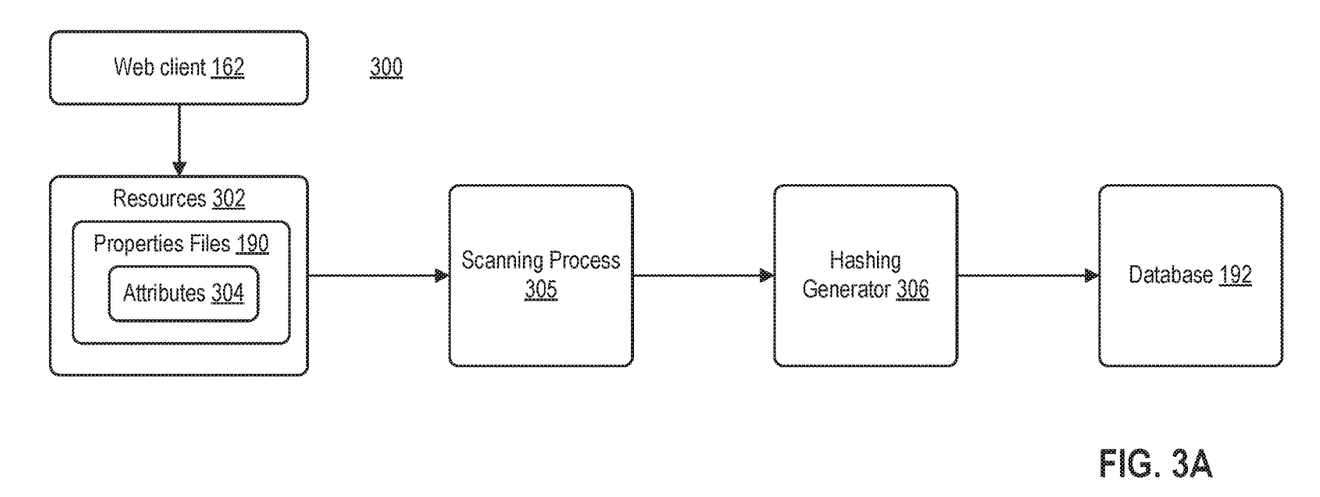
FIG. 3A is a logical block diagram of an environment having web client running therein, tracking method, according to one embodiment.

FIG. 2A is a flow diagram illustrating a method 200 of creating database 192 storing key/value mappings, according to an embodiment. FIG. 3A is a logical block diagram of an environment 300 having web client 162 running therein, tracking method 200, according to one embodiment. At step 202, a mapping program 194 in vendor platform 180 accesses resources of web client 162. As shown, web client 162 includes resources 302. Resources 302 may generally comprise properties files 190 and attributes 304 associated with each properties file 190. The attributes 304 may also include one or more strings that are customizable, developer-defined labels for a feature in web client 162 defined by properties file 190. For example, one string may be "Create new VM" corresponding to one properties file 190. Each string 304 may not be subsequently customized by an end-user.

In addition to developer-defined labels, web client 162 may also include user-sensitive information. Typically, a user may enter a name, description, tag, or other custom string for a given object in the user interface. For example, a user may name a virtual machine "company-finance-vm." User-defined strings, such as "company-finance-VM" are specified by customers, and are not maintained in any properties file. As such, user-defined strings may only be maintained in a database, e.g., database 196, and never exits the customer environment deobfuscated.

In another example, a third party plugin may contain customer-sensitive information. For example, a user may define a new context menu item with the label "add to sod-finance resources." Similarly, user-defined strings in the third party plugin may only be maintained in a database (not shown) corresponding to the third party plugin. As discussed above, in an embodiment, properties files 190 may be packaged with web client 162. In another embodiment, properties files 190 may be transmitted to, or accessed by, mapping program 194 via network 105.

At step 204, mapping program 194 scans properties files 190 of web client 162 to extract deobfuscated strings from the attributes 304 corresponding to each properties files 190 (scanning process 305). After properties files 190 are found, at step 206, obfuscation agent 172 runs a hashing algorithm on the strings of each properties file 190. In other words, obfuscation agent 172 generates the value for each key found by mapping program 194. For example, for button "Refresh," obfuscation agent 172 may apply an algorithm on the string associated with "Refresh" to yield "0e91610117029a62a479b7fa7df0b8598bebe3able192d-4b1882e310719c9671." Shown visually in FIG. 3A, each of the one or more strings is passed through a hashing generator 306 for such hashing.

At step 208, mapping program 194 associates each obfuscated string (i.e., value) with attributes 199 (i.e., key) of a properties file 190. For example, attributes 199 of a properties file 190 includes the deobfuscated value and the locale of the value so that obfuscated values of the same string in other locales can be found. As such, mapping program 194 creates key/value database 192 that lists mappings of attributes 199 of properties file 190 with one or more developer-defined obfuscated strings (step 210). For example, if mapping program 194 finds that the sequence of clicks $x_1, x_2, x_3, \ldots x_n$ is widely used by one or more users, where $\{x_1, x_2, x_3, \ldots x_n\}$ are obfuscated values and associates each value with its respective deobfuscated value identifying a component, uniquely, in properties file 190, e.g., {"Create new VM", "From an OVF template", "Add CPU", . . . "n"}, during analysis, analytics agent 174 can easily look up to which properties file component each click (i.e., $\exists\ x_i \in \{x_1, x_2, x_3, \ldots x_n\}$) corresponds, as well as the locale of the value. Thus, the method maintains the obfuscation of user-sensitive string values while "deobfuscating" the insensitive properties files 190 information for use in further analysis.

Figure 2B:
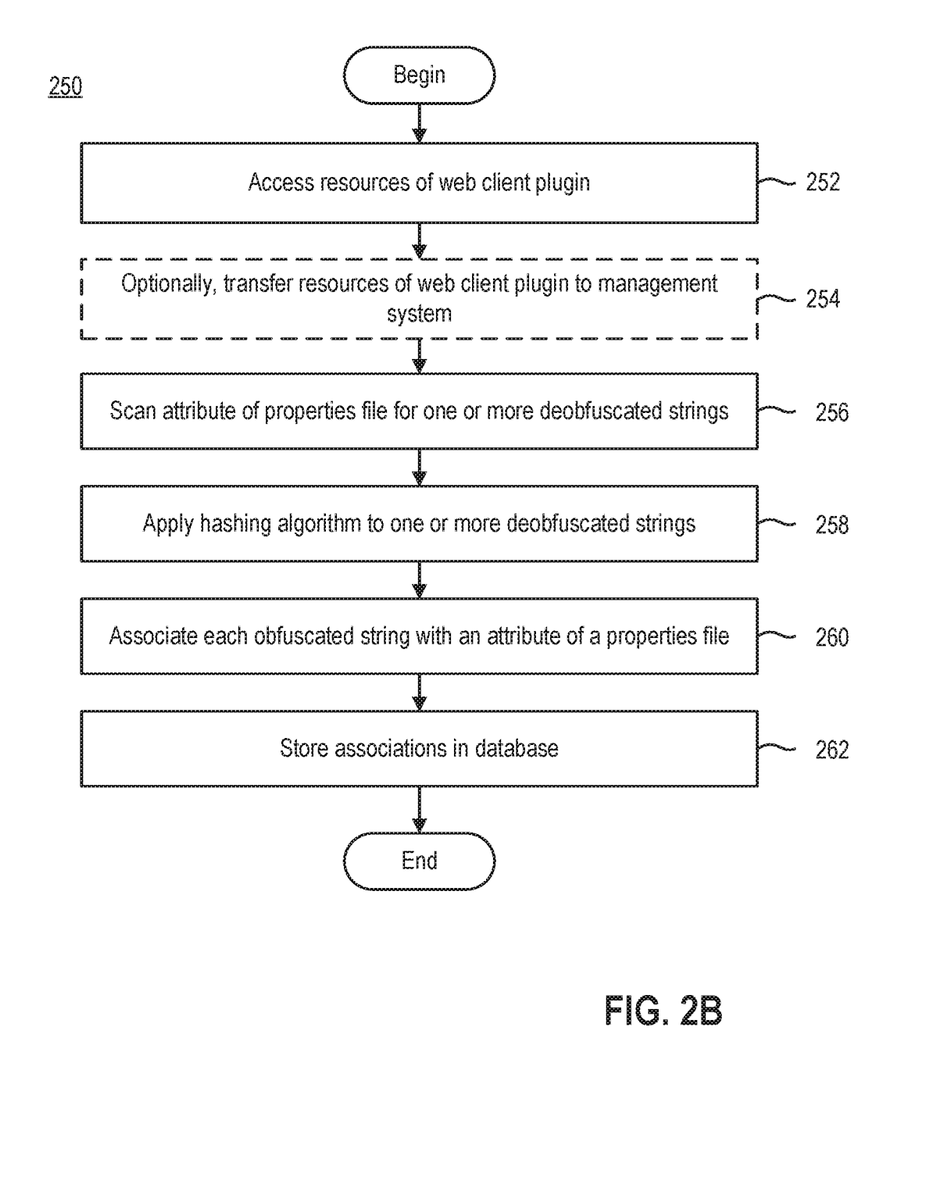
FIG. 2B is a flow diagram illustrating a method of creating database storing key/value mappings for a web client plugin, according to an embodiment.
Figure 3B:
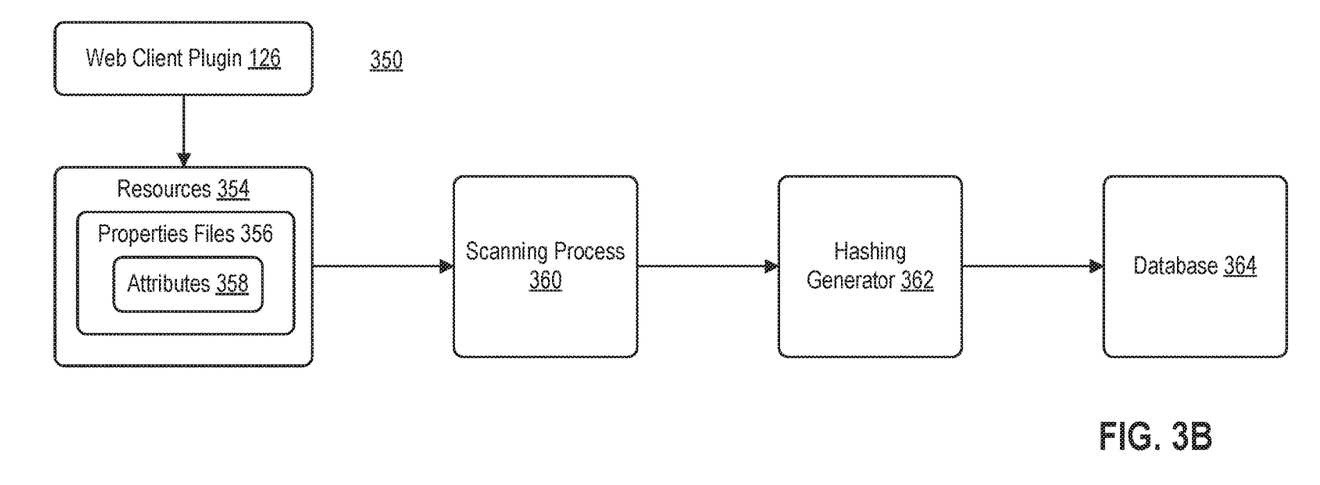
FIG. 3B is a logical block diagram of an environment having web client plugin running therein, tracking method, according to one embodiment.

FIG. 2B is a flow diagram of a method 250 of creating a database storing key/value mappings for a web client plugin, according to an embodiment. FIG. 3B is a logical block diagram of an environment 350 having web client plugin 126, tracking method 250, according to one embodiment. Generally, web client plugin 126 may be a second, or third, party plugin generated by a developer for use with web client 162. Because web client plugin 126 was generated by user, there is a risk that web client plugin 126 would expose sensitive data. For example, the sensitive data may be in the form of a customizable button on user interface of web client plugin 126. As such, a similar method of obfuscating sensitive information in web client 162 may be applied to web client plugin 126.

At step 252, mapping program 194 accesses resources of web client plugin 126. As shown, web client plugin 126 includes resources 354. Resources 354 may generally comprise properties files 356 and attributes 358 associated with each properties file 356. The attributes 358 of properties files 356 includes the deobfuscated value and the locale of the value, so that deobfuscated values of the same string in other locales can be found. For example, one deobfuscated value in attributes 358 may be "Create new VM" corresponding to an entry in one properties file 356. In an embodiment, properties files 356 may be packaged with web client plugin 126 and accessed by analytics agent 174 over network 105. In another embodiment, properties files 356 may be transmitted to analytics agent 174 via network 105 (step 254). In another embodiment, properties files 356 are maintained on user device 160 and the user performs the subsequent steps to create a key/value database.

At step 256, mapping program 194 scans properties files 356 of web client plugin 126 to extract one or more obfuscated strings from attributes 358 corresponding to each properties files 356 (scanning process 360). After properties files 356 are found, at step 258, obfuscation agent 172 runs a hashing algorithm on the deobfuscated values of the attributes 358 of each properties file 356. In other words, obfuscation agent 172 generates the value for each key found by mapping program 194. For example, for button "Refresh," obfuscation agent 172 may apply a hashing algorithm on the string associated with "Refresh" to yield "0e91610117029a62a479b7fa7df0b8598bebe3able192d4-b1882e310719c9671." Shown visually in FIG. 3A, each of the one or more deobfuscated value is passed through a hashing generator 362 for such hashing.

At step 260, mapping program 194 associates each obfuscated string (i.e., value) with unique attributes (i.e., key) of a properties file 356. As such, mapping program 194 creates a key/value database 364 that lists mappings of each attribute 358 of properties files 356 with one or more developer-defined obfuscated strings (step 262). For example, if mapping program 194 finds that the sequence of clicks $x_1, x_2, x_3, \ldots x_n$ is widely used by one or more users, where $\{x_1, x_2, x_3, \ldots x_n\}$ are obfuscated values and associates each value with its respective deobfuscated value identifying a component, uniquely, in properties file 190, e.g., {"Create new VM", "From an OVF template", "Add CPU", . . . "n"}, and the locale of the deobfuscated value during analysis, analytics agent 174 can easily look up to which properties file entry each click (i.e., $\exists\ x_i \in \{x_1, x_2, x_3, \ldots x_n\}$) corresponds. Thus, the method maintains the obfuscation of user-sensitive string values while "deobfuscating" the insensitive properties file 190 information for use in further analysis. In an embodiment, database 364 may be the same as database 192, meaning that entries for web client plugin 126 are added to existing database 192 for web client 162. In another embodiment, database 364 may be a separate database that is merged with database 192. In another embodiment, database 364 may be a database completely separate from database 192, and also is referenced separately from database 192.

Figure 4:
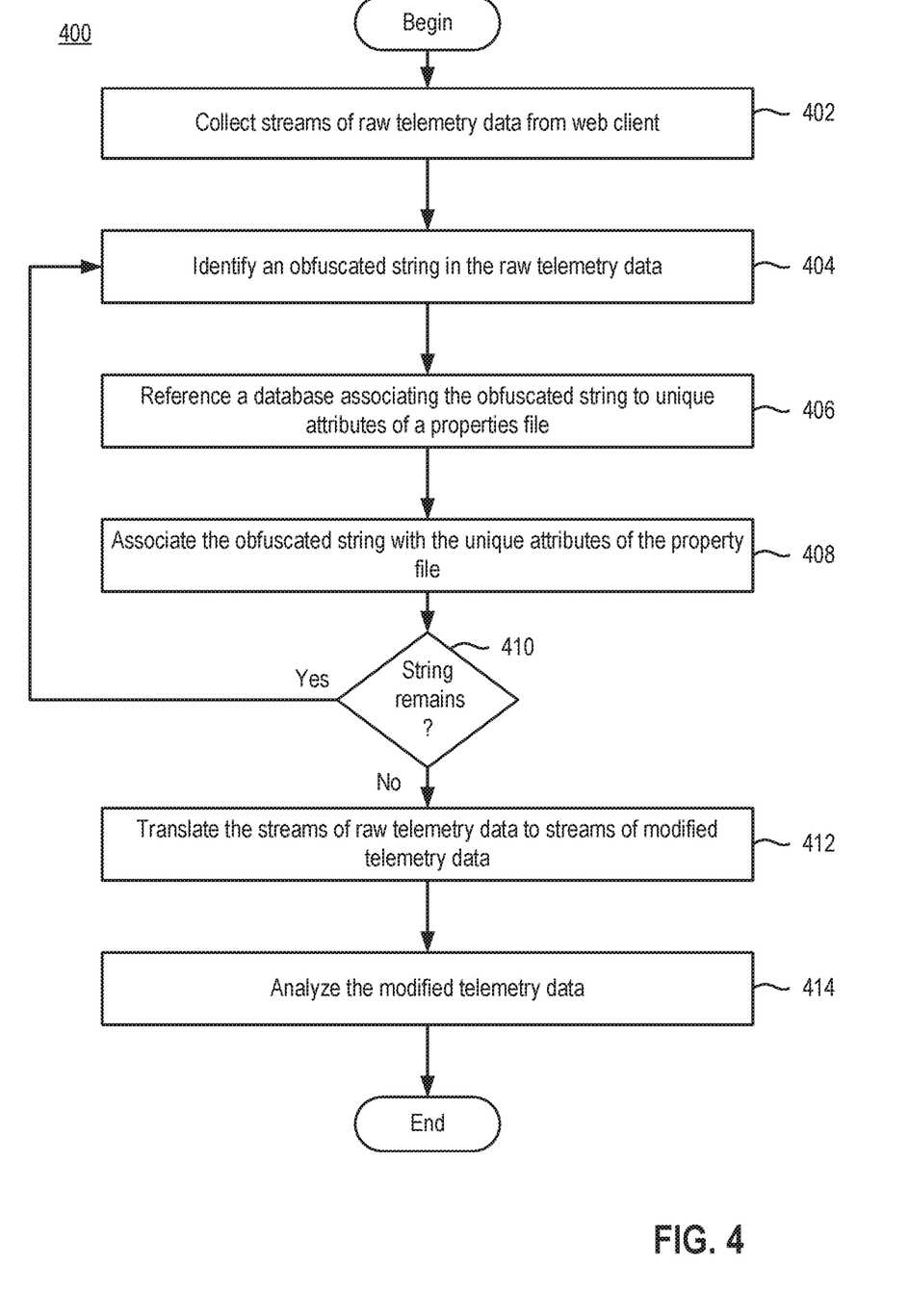
FIG. 4 is a flow diagram of a method of analyzing telemetry data of a web client, according to one embodiment.

FIG. 4 is a flow diagram of a method 400 of analyzing telemetry data of a web client (e.g., web client 162), according to one embodiment. At step 402, telemetry agent 170 collects streams of raw telemetry data from web client 162. The raw telemetry data includes a plurality of obfuscated string values. The obfuscated string values may include those values that are developer-defined and those values that are user-defined labels in web client 162. In an embodiment, the raw telemetry data also comprises raw telemetry data from web client plugin 126.

At step 404, analytics agent 174 identifies an obfuscated string in the raw telemetry data. For example, analytics agent 174 may choose a first obfuscated string from a plurality of obfuscated strings. At step 406, analytics agent 174 references a database (e.g., database 192) that associates each developer-defined obfuscated string in web client 162 to unique attributes 199 in properties file 190. For example, analytics agent 174 accesses a pre-generated database that contains key/value entries mapping each obfuscated string (i.e., key) in web client 162 with unique attributes (i.e., value), such as deobfuscated value of properties file 190 in web client 162 and the locale of the deobfuscated value. In an embodiment, database 192 may include both the key/value pairs for web client 162 as well as web client plugin 126. In another embodiment, there exists a separate database for key/value pairs associated with web client plugin 126. In this embodiment, analytics agent 174 also references the separate database when searching for obfuscated string entries.

At step 408, analytics agent 174 associates the first obfuscated string with its respective attributes entry in database 192. Note, that analytics agent 174 is only able to associate those obfuscated strings that are not user-defined with a respective entry in database 192. This is because user-defined strings are not included in a properties file 190, and thus remain obfuscated throughout. At step 410, analytics agent 174 determines whether there are any obfuscated strings left to be analyzed. If there are remaining obfuscated strings, method 400 reverts to step 404. If there are no remaining obfuscated strings, then at step 412, analytics agent 174 translates the streams of raw telemetry data to streams of modified telemetry data. The modified telemetry data comprises the unique deobfuscated value in properties files 190 which correspond to each developer-defined obfuscated string in the raw telemetry data strings.

At step 414, analytics agent 174 analyzes the modified telemetry data. For example, telemetry agent 170 analyzes the modified telemetry data. The telemetry data may be used to detect and analyze behaviors of users using web client 162.

As such, the de-obfuscation strategy aids in maintaining the privacy of user sensitive information while allowing access to insensitive information for clickstream analytics. Because user-specified strings are not contained in properties files 190, user specified strings will continually remain obfuscated. Thus, only the developer-specified strings, which exist in properties files 190, will be de-obfuscated. The developer-specified strings cannot be considered "sensitive" because these strings remain constant across all end-users. Accordingly, user experience with web client 162, as well as web client plugin 126, may be improved.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of analyzing telemetry data of a web client, comprising:
    collecting streams of raw telemetry data from the web client, wherein the telemetry data comprises obfuscated strings, the obfuscated strings comprising at least one user-sensitive string;
    for at least one of the obfuscated strings, referencing a database associating the obfuscated string to attributes of a properties file of the web client, wherein the attributes include at least a deobfuscated string corresponding to the obfuscated string;
    translating the streams of raw telemetry data to streams of modified telemetry data, wherein the modified telemetry data comprises the deobfuscated string from the attributes corresponding to the properties file and obfuscation of the at least one user-sensitive string is maintained with the deobfuscated string in modified telemetry data; and
    analyzing the streams of modified telemetry data.

2. The method of analyzing telemetry data of the web client of claim 1, wherein collecting streams of raw telemetry data from the web client, wherein the telemetry data comprises obfuscated strings, comprises:
    collecting another streams of raw telemetry data of a web client plugin for the web client.

3. The method of analyzing telemetry data of the web client of claim 2, wherein for each obfuscated string, referencing a database associating the obfuscated string to attributes in a properties file of the web client, wherein the attributes includes at least the deobfuscated string corresponding to the obfuscated string, comprises:
    for each obfuscated string associated with web client plugin, referencing another database associating the obfuscated string to attributes in a properties file of the web client plugin.

4. The method of analyzing telemetry data of the web client of claim 3, wherein translating the streams of raw telemetry data to streams of modified telemetry data, wherein the modified telemetry data comprises the deobfuscated string from the attributes corresponding to the properties file, comprises:
    translating the other streams of raw telemetry data associated with web client plugin to another streams of modified telemetry data, wherein the other streams of modified telemetry data comprises the deobfuscated string from the attributes corresponding to the properties file of the web client plugin.

5. The method of claim 1, wherein attributes of a properties file further includes a locale of the obfuscated string.

6. The method of analyzing telemetry data of the web client of claim 1, wherein the database includes a plurality of key/value entries, wherein a key refers to an obfuscated string and a value refers to attributes of a properties file.

7. The method of analyzing telemetry data of the web client of claim 1, wherein the database is generated through a process, comprising:
    scanning the properties files of the web client;
    extracting a deobfuscated string associated with each properties file;
    applying a hashing algorithm to the deobfuscated string to generate an obfuscated string;
    associating each obfuscated string with at least its respective deobfuscated string from a properties file; and
    storing the association in the database.

8. A non-transitory computer readable medium having instructions stored thereon that when executed by a processor cause the processor to perform a method of analyzing telemetry data of a web client, comprising:
    collecting streams of raw telemetry data from the web client, wherein the telemetry data comprises obfuscated strings, the obfuscated strings comprising at least one user-sensitive string;
    for at least one of the obfuscated strings, referencing a database associating the obfuscated string to attributes of a properties file of the web client, wherein the attributes include at least a deobfuscated string corresponding to the obfuscated string;
    translating the streams of raw telemetry data to streams of modified telemetry data, wherein the modified telemetry data comprises the deobfuscated string from the attributes corresponding to the properties file and obfuscation of the at least one user-sensitive string is maintained with the deobfuscated string in modified telemetry data; and
    analyzing the streams of modified telemetry data.

9. The non-transitory computer readable medium of claim 8, wherein collecting streams of raw telemetry data from the web client, wherein the telemetry data comprises obfuscated strings, comprises:
    collecting another streams of raw telemetry data of a web client plugin for the web client.

10. The non-transitory computer readable medium of claim 9, wherein for each obfuscated string, referencing a database associating the obfuscated string to attributes in a properties file of the web client, wherein the attributes includes at least the deobfuscated string corresponding to the obfuscated string, comprises:

for each obfuscated string associated with web client plugin, referencing another database associating the obfuscated string to attributes of a properties file of the web client plugin.

11. The non-transitory computer readable medium of claim 10, wherein translating the streams of raw telemetry data to streams of modified telemetry data, wherein the modified telemetry data comprises the deobfuscated string from the attributes corresponding to the properties files, comprises:

translating the other streams of raw telemetry data associated with web client plugin to another streams of modified telemetry data, wherein the other streams of modified telemetry data comprises the deobfuscated string from the attributes corresponding to the properties file of the web client plugin.

12. The non-transitory computer readable medium of claim 8, wherein attributes of a properties file further includes a locale of the obfuscated string.

13. The non-transitory computer readable medium of claim 8, wherein the database includes a plurality of key/value entries, wherein a key refers to an obfuscated string and a value refers to attributes of a properties file.

14. The non-transitory computer readable medium of claim 8, wherein the database is generated through a process, comprising:

scanning the properties files of the web client;
extracting an un-obfuscated string associated with each properties file;
applying a hashing algorithm to the un-obfuscated string to generate an obfuscated string;
associating each obfuscated string with at least its respective deobfuscated string from properties file; and
storing the association in the database.

15. A computer system, comprising:

a processor; and
a memory storing program code, which, when executed on the processor, performs a method of analyzing telemetry data of a web client, comprising:
collecting streams of raw telemetry data from the web client, wherein the telemetry data comprises obfuscated strings, the obfuscated strings comprising at least one user-sensitive string;
for at least one of the obfuscated strings, referencing a database associating the obfuscated string to attributes of a properties file of the web client, wherein the attributes include at least a deobfuscated string corresponding to the obfuscated string;
translating the streams of raw telemetry data to streams of modified telemetry data, wherein the modified telemetry data comprises the deobfuscated string from the attributes corresponding to the properties file and obfuscation of the at least one user-sensitive string is maintained with the deobfuscated string in modified telemetry data; and
analyzing the streams of modified telemetry data.

16. The computer system of claim 15, wherein collecting streams of raw telemetry data from the web client, wherein the telemetry data comprises obfuscated strings, comprises:

collecting another streams of raw telemetry data of a web client plugin for the web client.

17. The computer system of claim 16, wherein for each obfuscated string, referencing a database associating the obfuscated string to attributes in a properties file of the web client, wherein the attributes includes at least the deobfuscated string corresponding to the obfuscated string, comprises:

for each obfuscated string associated with web client plugin, referencing another database associating the obfuscated string to attributes of a properties file of the web client plugin.

18. The computer system of claim 17, wherein translating the streams of raw telemetry data to streams of modified telemetry data, wherein the modified telemetry data comprises the deobfuscated string from the attributes corresponding to the properties files, comprises:

translating the other streams of raw telemetry data associated with web client plugin to another streams of modified telemetry data, wherein the other streams of modified telemetry data comprises the deobfuscated string from the attributes corresponding to the properties file of the web client plugin.

19. The computer system of claim 16, wherein the attributes of the properties file further includes a locale of the obfuscated string.

20. The computer system of claim 15, wherein the database includes a plurality of key/value entries, wherein a key refers to an obfuscated string and a value refers to attributes of a properties file.

* * * * *